United States Patent [19]

Brendley, Jr.

[11] 3,711,449
[45] Jan. 16, 1973

[54] INTERPOLYMERS OF SULFOALKYLENE ACRYLATES

[75] Inventor: William H. Brendley, Jr., Hatboro, Pa.

[73] Assignee: Rohm and Haas Company, Philadelphia, Pa.

[22] Filed: Sept. 18, 1970

[21] Appl. No.: 73,677

[52] U.S. Cl. .......... 260/79.3 MU, 117/132, 117/161, 260/2.2 R, 260/73, 260/77.5 CR, 260/844, 260/851
[51] Int. Cl. ....... C08f 15/40, C08f 15/02, C08f 27/10
[58] Field of Search ....... 260/79.3 MU, 80.73, 80.75, 260/80.8

[56] References Cited

UNITED STATES PATENTS

| | | | |
|---|---|---|---|
| 2,914,499 | 11/1959 | Sheetz | 260/29.6 |
| 2,923,734 | 2/1960 | Sheetz | 260/486 |
| 2,964,557 | 12/1960 | Niederhauser | 260/486 |
| 3,024,221 | 3/1962 | Le Fevre | 260/79.3 MU |
| 3,033,833 | 5/1962 | Le Fevre | 260/79.3 MU |

OTHER PUBLICATIONS

Kangas, D. A., J. Polym. Sci. A–1, 8, 1813 (1970).
Kangas, D. A. et al., J. Polym. Sci. A–1, 8, 3543–3555 (1970).

*Primary Examiner*—James A. Seidleck
*Assistant Examiner*—C. A. Henderson, Jr.
*Attorney*—G. W. F. Simmons and Carl A. Castellan

[57] ABSTRACT

In accordance with the present invention, copolymers containing units of sulfo-alkyl acrylate or methacrylate of the formula $H_2C=CH(R)-CO_2-A-SO_3H$ wherein R is H or methyl and A is a ($C_2-C_3$)alkylene group are prepared in an essentially anhydrous medium. Such copolymers have unusual characteristics, including outstanding improvement in adhesion to numerous substrates and especially metals, which are lacking in analogous copolymers made in an aqueous medium. Hence the new copolymers are extremely useful in making coating compositions.

1 Claim, No Drawings

INTERPOLYMERS OF SULFOALKYLENE ACRYLATES

DESCRIPTION OF THE INVENTION

U.S. Pats. Nos. 2,923,734 and 3,024,221 disclose the preparation of sulfoalkyl acrylate or methacrylate monomers and alkali metal salts thereof. These patents disclose the production of homopolymers and copolymers of a mixture of two or more of these monomers that are useful as thickening agents, stabilizers for aqueous colloidal dispersions and emulsions, surface active agents, soil-conditioners, antistatic finishes for textiles and plastics, adhesives, sizes for textiles and paper, and dye assistants.

U.S. Pat. No. 3,033,833 discloses the polymerization in an aqueous medium of a mixture of a sodiosulfoalkyl acrylate monomer with one or more hydrophobic monomers containing about 0.5 to 99.5% of the former. Interpolymers of normally hydrophobic monomers and minor proportions of sulfo esters of the kind hereinbefore described give rise to useful products that are antistatic and susceptible to dyeing. Thus copolymers of about 5 percent of such monomers with acrylonitrile where formed into fibers having excellent dyeability, lightfastness, crockfastness, washfastness and stability to dry cleaning.(col. 7, lines 58–63 of the patent).

Larger proportions of the sulfo esters in the interpolymer give rise to water-dipersible or water-soluble compositions useful as surface active agents, soil conditioning agents, thickeners and stabilizers for colloidal emulsions and dispersions such as polymer latices, textile sizes, dye assistants and the like. Water-insoluble interpolymers containing major proportions of sulfo esters polymerically combined therein are useful ion exchange agents.

U.S. Pat. No. 2,914,499 claims the use of 0.1 to about 10 parts by weight of a sulfoalkyl acrylate or methacrylate monomer or a sodium salt thereof per 100 parts by weight of normally hydrophobic ethylenically unsaturated monomer in the emulsion polymerization of one or more of the latter type of monomer to produce unusually stable latices when 0.1 to about one part of the former type of monomer is used and redispersible polymers when 5 to 10 parts of the former type of monomer is used.

In accordance with the present invention, it has been discovered that coating compositions formed of certain novel copolymers, containing from 0.2 percent to 1.0 percent by weight of a sulfoalkyl (meth)acrylate of the following formula:

$H_2C=CH(R)-C(O)O-A-SO_3H$     I wherein R is hydrogen or methyl, and

A is a ($C_2$–$C_3$)alkylene group having at least two carbons extending in a chain between the oxygen and sulfur atoms deposit coatings which have surprisingly improved adhesion toward various substrates, and especially bare or primed cold-rolled steel.

The copolymers of the present invention are formed by polymerization in an essentially anhydrous medium of a mixture of monomers containing 0.2 to 1.0 percent by weight of a monomer of formula I. The copolymerization may be carried out in bulk or in solution in an organic liquid medium in which the monomer mixture is soluble but in which the copolymer may or may not be soluble.

While radiation, e.g., ultraviolet, ionizing rays, electron beams, $\beta$-rays, etc., may be used, it is generally most practical to employ a free-radical type of initiation. Such an initiator should have an appreciable solubility in the polymerization medium whether that is constituted by the monomer mixture itself, a solution thereof in an essentially anhydrous solvent medium, or in an essentially anhydrous liquid in which the monomers, but not the polymer, are soluble.

Examples of such initiators include organic peroxides, such as benzoyl peroxide, lauroyl peroxide, acetoyl peroxide, t-butylhydroperoxide, and azo compounds, such as azodiisobutyronitrile, azodiisobutyramide and diethyl azodiisobutyrate. The amount of initiator that may be used may be in the range of about 0.05 to 3 percent by weight, based on the weight of the monomer mixture.

In bulk or mass copolymerization, the copolymer obtained may be used directly without purification. On the other hand, it may be desirable to perform some purification as by distilling off any residual monomer, or by extracting any residual initiator in a liquid solvent medium preferentially dissolving the catalyst. The copolymer, before or after purification, may be dissolved in a suitable solvent to form a coating composition of any desired concentration and viscosity.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

Copolymerization of a solution of the monomer mixture can be predetermined, in many instances, to produce a dispersion of minute particles of the copolymer which are insoluble in the polymerization medium. Such dispersions can be made in the manner described in Canadian Pat. No. 635,683.

Generally, the copolymers obtained in the several ways mentioned will have molecular weights in the range of about 40,000 to 300,000 viscosity average. The preferred range is about 85,000 to 120,000 for coating purposes. When a particular monomer mixture normally produces a higher molecular weight than is desired for a given purpose, a chain transfer agent may be included in the polymerization medium. Examples include long-chain mercaptans, such as lauryl mercaptan and palmityl mercaptan.

Any copolymerizable monoethylenically unsaturated compound having a group of the formula

may be copolymerized with the sulfonic acid-containing compound of formula I. If desired two or more such comonomers may be employed. Examples of such monomers are the esters and nitriles of acrylic acid or methacrylic acid, such as acrylonitrile, ($C_1$—$C_{18}$)—alkyl, alkyl, cyclohexyl, benzyl, and isobornyl acrylates or meth-acrylates; vinylidene chloride, vinyl chloride; also the vinyl esters of ($C_1$—$C_{18}$)alkanoic acids, especially vinyl acetate, vinyl laurate, and vinyl versatate; and vinyl-aromatic compounds, such as styrene and vinyltoluene (o, m or p). One or more of the various monomers just mentioned may constitute the entire comonomer content in the copolymers of one or more monomers of formula I. However small amounts ranging from 0.2 to 20 percent by weight of hydrophilic monomers may also be included for special purposes. Examples include $\alpha,\beta$-monoethylenically unsaturated acids and amides, such as acrylic acid, methacrylic acid, itaconic acid, acrylamide, methacrylamide, N-methylol-acrylamide or -methacrylamide, N-butoxymethyl-acrylamide or -methacrylamide and hydroxyalkyl esters of such acids, such as $\beta$-hydroxyethyl acrylate or methacrylate, $\beta$-hydroxypropyl acrylate or methacrylate, and 3-hydroxypropl acrylate or methacrylate. When the copolymers include carboxylic acid or amide monomers it is generally preferred that the maximum content thereof be about 5 percent, and for some purposes not over about 1 percent by weight of the total monomeric content of the copolymers. However, in the case of the hydroxyl-containing monomers, the content may be even higher than 20 percent, such as up to 50 percent. Generally, a content of hydroxyl-containing monomer in the range of 5 to 15 percent by weight is adequate to provide whatever characteristic is desired and obtainable from this component.

The latter monomers have groups which contain reactive hydrogen atoms and provide additional reactivity without rendering the copolymer excessively sensitive to moisture. Such reactivity is useful for providing coating compositions adapted to be thermoset by inclusion of polyfunctional reactants, such as formaldehyde or sources thereof including paraformaldehyde, urea/formaldehyde, phenol/formaldehyde and melamine/formaldehyde condensates, and organic poly-isocyanates, such as hexamethylene diisocyanate and toluene diisocyanates.

The copolymers of the present invention are made in an anhydrous medium by batch procedures wherein the monomers are mixed and an initiator is charged to a portion of the mixture in the case of bulk polymerization or to a portion of an organic solvent for the monomers in the case of solution or dispersion polymerization followed by gradual addition of further portions of the monomer mixture until the entire batch has been copolymerized. Arrangements for heating or cooling the copolymerization system may be operated as needed to hasten or control the reaction at any of its stages. Normally, the temperature of the reaction is controlled in the range of about 50° to 90° C. The process may be modified to provide for continuous copolymerization wherein the monomer mixture passes continuously through a reaction zone and the polymer product is discharged continuously therefrom.

Also, a graft or layer polymer technique may be used wherein successive batch portions of monomer have different compositions. For example, the first portion polymerized may be constituted of all the monomer or monomers except that of formula I and the latter monomer may be included only in the last portion of the monomer added or it may be added separately after all of the other monomer has been added and substantially polymerized. Alternatively, the monomer of formula I may be included only in the first monomer portion or in an intermediate monomer portion added to the polymerization vessel. When a hydrophilic reactive monomer is included, it may be introduced with that of formula I or along with the other monomer in the procedures mentioned above or it may be introduced separately before or after the monomer of formula I is added whether the latter is added at an early, late or in-between stage.

Regardless of which of the copolymerization methods mentioned above is employed, the resulting copolymer is dissolved or dispersed in a suitable organic solvent or liquid which must be essentially anhydrous for application of coatings on substrates of any kind.

The coating composition may contain one or more external plasticizers in an amount up to 50 percent by weight of the weight of the copolymer. Examples of plasticizers that are suitable include benzyl butyl phthalate, dibutyl phthalate, triphenyl phosphate, 2-ethyl hexyl benzyl phthalate and dicyclohexyl phthalate. Other well-known plasticizers which may be employed include diallyl phthalate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthio-disuccinate, butyl phthalyl butyl glycolate, acetyl tributyl citrate, dibenzyl sebacate, tricresyl phosphate, toluene ethyl sulfonamide, the di-2-ethylhexyl ester of hexamethylene diphthalate, and di(methylcyclohexyl)phthalate. The particular plasticizer and the amount thereof used are chosen in accordance with the demand for compatibility.

Various solvents may be employed as the polymerization medium and/or in the coating composition when it is a solution of the copolymer, such as toluene, xylenes, acetone, methyl ethyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol, cyclohexanol, ethylene dichloride, diisobutyl ketone, cyclohexanone, 2-butoxyethanol, furfuryl, petroleum naphtha, boiling in the range of about 87° to about 145°C., cyclohexane, hexane aromatic hydrocarbon mixtures, and also various aliphatic, naphthenic and aromatic naphthas. While certain of these solvents cannot be used alone because of lack of solvent power for the copolymers, they can in a mixture with others. Mixtures of such solvents are also quite useful. The aliphatic hydrocarbons may be used in the copolymerization to form dispersions.

The solution or dispersion may be applied as a clear lacquer. Alternatively, a pigment and/or filler may be incorporated in an amount up to 100 percent by weight of the polymer in the lacquer finishing compositions. Examples of suitable pigments include titanium dioxide, carbon black, iron blues, phthalocyanine reds, blues and greens; metal oxides, hydroxides, sulfides, sulfates, silicates and chromates; aluminum flake, bronze powders, and various fillers or extenders such as talc, barytes, china clay and diatomaceous earth.

It will be obvious to those skilled in the organic coating art that the amount of pigment may be varied widely, depending on the effect desired. The amount of pigment, by weight based on the weight of the organic film-forming material, may vary between about 2 percent for light, high-hiding pigments, such as carbon black, and about 100 percent for heavy, low-hiding pigments such as lead chromate.

It is common practice in the coating art to prepare liquid coating compositions on a commercial basis in a highly concentrated form. In comparison with the same composition, the concentrated form is more resistant to pigment-settling during storage, is cheaper to store and ship because less weight and space are involved and is in a more adaptable condition for the addition of thinning and/or other modifying materials by the ultimate user to adjust the composition to his own liking. Therefore, the concentrated coating compositions from which the lacquers of this invention may be prepared by merely admixing appropriate organic liquids form a part of this invention. The maximum degree of concentration, i.e. the maximum non-volatile solids content, is limited only by the maximum consistency which can be conveniently handled by the manufacturer and the ultimate user. While concentrated lacquers having a non-volatile solids content of 75 percent by weight, or even higher, may be prepared, the normal concentration is usually between 30 and 60 percent. The minimum concentration is obviously the solids content of the ready-to-apply lacquers; but, as previously mentioned, such compositions are not usually prepared by the manufacturer because they are not adaptable to adjustment by the user.

The method of dispersing or grinding pigment in the film-forming materials is not critical provided a smooth, uniform dispersion of finely divided pigment is produced. Examples of suitable equipment well known in the art are ball, pebble, buhrstone, roller and colloid mills and kneader-mixers, such as Banbury or Werner-Pfeiderer.

The concentrated lacquers may be reduced to whatever concentration is suitable for the particular manner of application. The application concentration may vary from about 5 to 30 percent non-volatile solids (that is, including plasticizer), depending upon the manner of application and the thickness of coating desired. For spraying, the concentration may be between 10 and 20 percent solids.

Any substrate may thus be coated, such as wood, ceramics, linoleum, vinyl resin tiles, metals including cold-rolled steel, either bare or primed, aluminum, copper, galvanized iron and phosphatized iron or steel, plastics, such as polyethylene, polypropylene, poly(methyl methacrylate), poly(vinyl chloride), copolymers of vinyl chloride with vinyl acetate, acrylonitrile and/or vinylidene chloride, copolymers of vinylidene chloride with acrylonitrile, ethyl acrylate or methacrylate, or methyl methacrylate, polyesters including polyethylene glycol terephthalate, aminoplasts including urea/formaldehyde and melamine formaldehyde resins, phenoplasts including phenol/formaldehyde resins, paper, leather and textile materials of all sorts (woven, knitted, netted, knotted and "nonwoven".)

The content of sulfonic acid-containing monomer of formula I in the copolymers made in accordance with the present invention enhances the adhesion of coatings formed thereof deposited on various substrates, and particularly on those of iron and steel, whether bare or primed with the customary primers including epoxy resin, aminoplast, phenoplast, epoxy-aminoplast, and those obtained by phosphatizing processes.

The coatings may be air-dried under normal conditions of atmospheric temperature and humidity with good ventilation. Air-drying to a state which permits handling may require 4 to 24 hours. Higher temperatures of drying may be employed, such as from about 140° to about 300°F. or more. The use of such elevated temperatures reduces the drying time so that drying at 150° to 200°F. may be fully accomplished in 30 to 60 minutes whereas the use of 250° to 300°F. generally shortens the time considerably.

On the other hand, they may also be subjected to a baking or curing step at a temperature over 200°F., as 220°F. to 400°F. for a period of a half-minute up to a half-hour or more, the higher the temperature the shorter the time.

When the composition comprises a polyfunctional reactant as mentioned above, a baking or curing stage is generally desirable to set the coating in infusible and/or insoluble condition. Curing catalysts may also be included in the conventional amount. Thus amines and/or dicarboxylic acid anhydrides may be used with compositions containing epoxy resins, acid or potentially acid catalysts may also be used with compositions containing formaldehyde, aminoplasts or phenoplasts, such as oxalic acid, formic acid, and amine salts, such as ammonium chloride, and the 2-methyl-2-aminoethanol salts of hydrochloric or sulfuric acids.

In the following examples, which are illustrative of the present invention, the parts and percentages are by weight, unless otherwise indicated.

EXAMPLE I

To a 3-liter, 4-necked flask there is charged 259.0g. of methyl methacrylate, 2.05g. of 2-sulfoethyl methacrylate, 67.5g. of a 40 percent solution of poly (lauryl methacrylate) in VM&P naphtha (a petroleum fraction containing about 45percent paraffins, about 46 percent naphthenic, and about 9 percent aromatic hydrocarbons boiling in the range of 200° to 300°F.), 8.1g. of methallyl chloride, 0.94g. of t-butyl peroctoate, 100g. of an isoparaffinic hydrocarbon boiling between 345° and 372°F. (available commercially under the tradename of Isopar H) and 225.3g. of heptane. The flask is fitted with a motor-driven stirrer, two dropping funnels, a thermoregulator, nitrogen inlet, and a reflux condenser. The flask is swept with nitrogen for 5 minutes at about 5000cc/min. with stirring. After sparging the flask charge with nitrogen at 150cc/min. for 5 minutes, a slow nitrogen sweep is then used for the duration of the reaction. The flask charge is stirred and heated to 90°C. and maintained at this temperature throughout. 30 minutes after reaching 90°C, two feeds are added gradually and uniformly over a three-hour period. These are (1) a solution of 4.80g. of sulfoethyl methacrylate in 607.2g. of methyl methacrylate and (2) a mixture of 192g. Isopar H, 304g. heptane, 2.21g. t-butyl peroctoate and 18.9g. of methallyl chloride. After the additions are completed the milky-white dispersion is held for 90 minutes, then one cc. of t-butyl peroctoate is added and the reaction continued for two more hours. A sample taken at this point has a solids content of 48.7 percent. Excess solvent, primarily heptane, is then stripped from the dispersion using vacuum, 190g. of strippings are recovered. The final product has a solids content of 55.8 percent and a Brookfield viscosity of 2400 cps.

When this solution is coated on metal panels primed with conventional epoxy ester primers, good adhesion is obtained at both low and high temperatures e.g. at −10°F. to 120°F.) Good low temperature adhesion is obtained on metals primed with acrylic polymer/melamine formaldehyde resin mixtures and to fiberglass-reinforced polyester resin substrates.

EXAMPLE 2

The materials listed in the following table are mixed in the amounts given in the table.

| Material | Amount |
| --- | --- |
| Methyl methacrylate | 693.1g. |
| Ethyl acrylate | 297.0g. |
| 2-Sulfoethyl methacrylate | 9.9g. |
| n-Dodecyl mercaptan | 5.0g. |
| Oxalic acid, 2.8% sol'n. | 1.0g. |
| Terpinolene | 0.3g. |
| Benzoyl peroxide | 0.4g. |

The mixture is degassed by subjection to a vacuum and then poured into a conventional casting mold made of a pair of glass plates separated about an eighth of an inch by a flexible rubber dam or strip to confine the mixture in the mold. The filled mold is heated for about 24 hours at 66°C. and then heated gradually to 120°C. over a period of about five hours. The sheet is removed from the mold and granulated while chilled, as by dry ice.

A 35 percent solution of this polymer is prepared in a toluene/butanol (95/5) mixture. When this solution is cast on a cold-rolled steel panel primed with an acrylic polymer/melamine formaldehyde substrate, excellent adhesion is obtained.

EXAMPLE 3

A monomer-catalyst mixture A is prepared from:

| Material | Grams |
| --- | --- |
| Butyl methacrylate | 203.7 |
| Methyl methacrylate | 135.8 |
| 2-Sulfoethyl methacrylate | 1.7 |
| Diisobutyronitrile | 1.4 |

Toluene (233g.) is placed in a 2-liter, three neck, round bottom flask, equipped with a mechanical stirrer, a reflux condenser, an addition funnel and a thermometer and heated to 100°C. by means of a thermostatically controlled oil bath (bath temperature 120°–125°C.) Then mixture A is added at an even rate (while continuously operating the stirrer) over a period of 2 hours.

A catalyst solution B is prepared by dissolving 1.58g. of diisobutyronitrile in 53.0g. of toluene. Solution B is added to the polymerization mixture in equal portions at 4, 5 and 6 hours after the starting of the addition of mixture A. The polymerizing mixture is maintained at 100° C. throughout the polymerization which is terminated at the end of seven hours when 180g. of toluene is added.

The resulting solution is diluted with additional toluene to spray viscosity and sprayed on steel panels primed with commercial alkyd/melamine formaldehyde, acrylic polymer/epoxide resin, and polyester/acrylic polymer primers. Good adhesion is obtained on the coatings whether merely air-dried or dried and baked at temperatures of 120° to 150°C.

EXAMPLE 4

Example 3 is repeated except that the monomer-catalyst mixture A thereof is replaced by a mixture of the following:

| Material | Grams |
| --- | --- |
| Butyl acrylate | 85.8 |
| Methyl methacrylate | 270.4 |
| 2-Sulfoethyl methacrylate | 0.8 |
| Diisobutyronitrile | 1.4 |

Coatings on various substrates show adhesion comparable to that of the polymer obtained in Example 3.

EXAMPLE 5

Example 3 is repeated replacing monomer-catalyst mixture A with a mixture of the following:

| Material | Grams |
| --- | --- |
| Ethyl acrylate | 226.0 |
| Acrylonitrile | 121.3 |
| 2-Sulfopropyl methacrylate | 1.7 |
| Diisobutyronitrile | 1.5 |

Coatings of the polymer solution obtained show comparable adhesion to the substrates mentioned.

EXAMPLE 6

Example 3 is repeated replacing monomer-catalyst mixture A with a mixture of the following:

| Material | Grams |
| --- | --- |
| Styrene | 235.0 |
| Butyl acrylate | 115.0 |
| 3-Sulfopropyl acrylate | 1.9 |
| Diisobutyronitrile | 1.6 |

Coatings of the polymer solution obtained show comparable adhesion to the substrates mentioned.

EXAMPLE 7

Example 3 is repeated replacing monomer-catalyst mixture A with a mixture of the following:

| Material | Grams |
| --- | --- |
| Vinyl acetate | 220.0 |
| Styrene | 100.0 |
| 2-Sulfoethyl acrylate | 2.2 |
| Diisobutyronitrile | 1.7 |

Coatings of the polymer solution obtained show comparable adhesion to the substrates mentioned.

I claim:

1. An addition copolymer of monoethylenically unsaturated monomeric material comprising (a) 0.2 to 1.0 percent by weight of at least one sulfonic acid-containing monomer of the formula $$H_2C=CH(R)-C(O)O-A-SO_3H$$

wherein R is hydrogen or methyl, and
 A is a $(C_2-C_3)$alkylene group having at least two carbons extending in a chain between the oxygen and sulfur atoms, and (b) at least one monomer selected from acrylonitrile, styrene, vinyltoluene, $(C_1-C_{18})$alkyl esters of acrylic acid, and vinyl esters of $(C_1-C_{18}$alkanoic acids, and (c) 0.2 – 20 percent by weight of at least one monomer selected from $\beta$-hydroxyethyl acrylate or methacrylate, $\beta$-hydroxypropyl acrylate or methacrylate, and 3-hydroxypropyl acrylate or methacrylate the copolymer having been prepared by polymerization of a solution of the monomeric material in an anhydrous medium.

* * * * *